(No Model.)
C. B. MORSE.
Fastening for Bale Ties.
No. 238,952. Patented March 15, 1881.
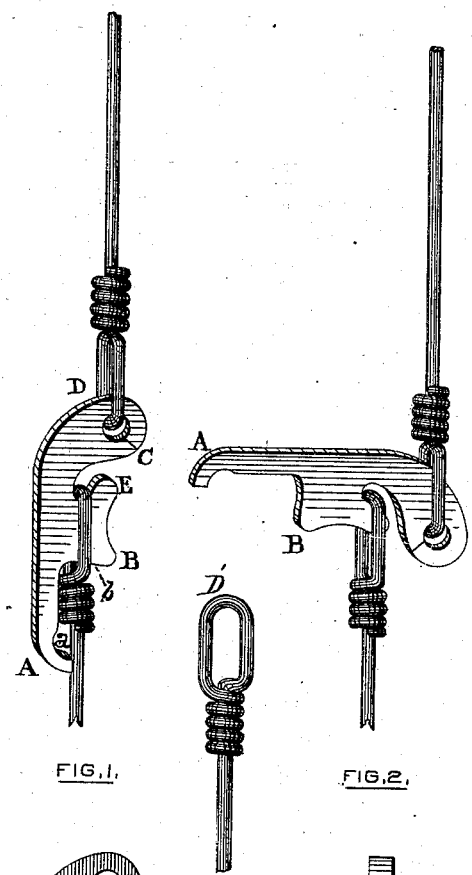
FIG.1. FIG.2. FIG.3. FIG.4. FIG.5. FIG.6.
WITNESSES, INVENTOR,
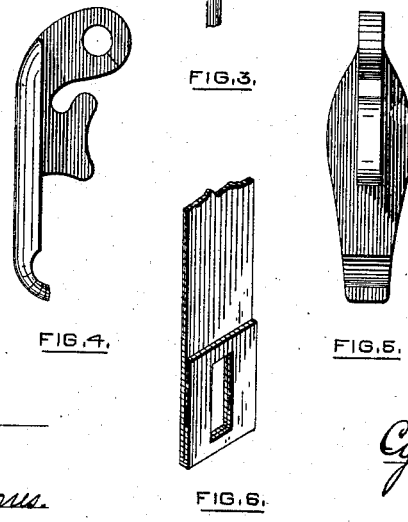

UNITED STATES PATENT OFFICE.

CYRUS B. MORSE, OF RHINEBECK, NEW YORK.

FASTENING FOR BALE-TIES.

SPECIFICATION forming part of Letters Patent No. 238,952, dated March 15, 1881.

Application filed February 1, 1881. (No model.)

*To all whom it may concern:*

Be it known that I, CYRUS B. MORSE, of the town of Rhinebeck, in the county of Dutchess and State of New York, have invented a new and Improved Bale-Tie or Latch-Fastening for Binders, of which the following is a specification.

The object of my invention is to provide a latch or fastening for bale-binders, whether round or flat, which latch securely holds or ties the binder, can be readily attached and detached, and may be preserved and used over and over again without further expense.

My device, as shown in the accompanying drawings, is simple, easily constructed and operated, and is better and cheaper than any known contrivance for a similar purpose. It is intended to sustain a great strain, and with binders, bands, or ties of strength proportionate to the size and weight of the bale will successfully withstand any stress therefrom. The necessity for cutting or breaking the binder, band, or tie to remove it from the bale is obviated, and a great saving is the immediate result.

In the accompanying drawings, which represent my fastening latch or device and binder, and the method of attaching and detaching the same, Figure 1 represents the latch attached to both ends of the binder as in actual operation. Fig. 2 represents the latch raised and shows the method of attaching and detaching the binder from the bale. Fig. 3 represents the eye or loop on a wire binder. Fig. 4 represents a latch for flat bands or binders. Fig. 5 is a plan view of the same. Fig. 6 represents the eye or loop in a flat band or binder.

These binders, bands, or ties, with such detachable fastenings, are made in a perfect and complete condition, of any suitable material, before attaching them to the bales. I prefer to use ordinary wire or band-iron for the binder, and malleable iron for the detachable latch.

My improved latch or fastening is made by casting or punching from sheet metal. It is provided with two bearings, C and E, for the bale-bands, which bearings are on opposite sides of the line of tension when the latch is applied, as shown in Fig. 1, as will hereinafter more fully appear. The eye or bearing C, in which the loop D of the band engages, may be left open, so that the loop may be readily inserted and withdrawn, or it may be permanently closed, as shown in the drawings. The latch is formed with a projection, B, the lower side, *b*, of which, or that opposite the bearing E, is preferably made slightly concave. The elongated or lever end A of the latch bears against the band, as shown in Fig. 1, when the strain of the expansion of the bale is thrown upon it, and thus prevents the two bearings C and E from being drawn into line with the band, the result of which is that the two bearings are kept on opposite sides of the line of tension, as before mentioned, and the strain of the band consequently holds the latch securely in place. The latch constitutes a lever having its fulcrum in the loop D.

My improved tie or latch is applied in the following manner: The loop D is placed in the bearing C, and while the bale is under pressure the loop D' is slipped in the bearing E, and when the pressure of the expansion of the bale is thrown upon the band the lever end of the latch is drawn down upon it, as described. The concave *b* in the projection B is for the purpose of preventing the loop D' from slipping out of the bearing E before the bale is released from the press.

To detach this latch and remove the binder from the bale I insert an ordinary bale-hook or other suitable device between the latch and binder at *a*, and raise the latch, as shown in Fig. 2. The action is to draw the ends of the binder toward each other, depressing one end and elevating the other, when the eye of the binder attached to the catch on the latch will slide off by the pressure of the bale without injury.

To make an eye or loop on the end of wire, I first bend the wire to nearly a right angle, at a sufficient distance from its end to form the eye properly. I then form the eye around a flat pin or mandrel, bringing the end of the wire behind the angle, and winding the same around the main wire, as shown in Fig. 3, thus making all the eyes nearly of the same size and shape, the more readily to admit of the latch being inserted in and secured to the eye at E and B, so that the latch will be held firmly in its place by the contracting or elastic pressure of the eye on the latch while the bale is in the press.

To make an eye or loop in flat bale bands or binders, I turn over about one inch of each end of the band. I then punch an eye or slot, as shown at Fig. 6, and attach and detach the latch in the same manner as with the round binder. A latch for a flat binder has a flange or projection on each side, as shown in Figs. 4 and 5, to strengthen it and protect the fastening.

Having thus described my invention, what I claim as new, and desire to secure by Letters Patent, is—

1. As a new article of manufacture, a latch or bale-tie for flat or round binders, in which the bearings for the binder are situated upon opposite sides of the line of tension, whereby it is held firmly and securely in place by the strain upon the binder.

2. The bale tie or latch herein described, having the fulcrum-bearing C and the bearing E for the binder, and the lever-extension A, for the purpose set forth.

3. The bale tie or latch herein described, having the bearings C and E for the binder, the concave portion $b$, and the lever-extension.

4. The flanged bale-tie or latch herein described for flat binders, having the binder-bearings and lever-extension, substantially as described.

5. A bale tie or latch substantially such as herein described, the lever-extension of which is recessed for the reception of a bale-hook, for the purpose set forth.

In testimony whereof I have hereunto subscribed my name this 25th day of January, A. D. 1881.

CYRUS B. MORSE.

Witnesses:
H. H. MORSE,
WM. F. RANDEL.